Jan. 1, 1924

J. R. BATTLE

LUBRICATOR

Filed July 7, 1922

1,479,641

Inventor:
John Rome Battle
By Butler & Denny
Attorneys

Patented Jan. 1, 1924.

1,479,641

UNITED STATES PATENT OFFICE.

JOHN ROME BATTLE, OF ARDMORE, PENNSYLVANIA.

LUBRICATOR.

Application filed July 7, 1922. Serial No. 573,325.

*To all whom it may concern:*

Be it known that I, JOHN ROME BATTLE, a citizen of the United States, residing at Ardmore, in the county of Montgomery and State of Pennsylvania, have invented certain Improvements in Lubricators, of which the following is a specification.

My invention is designed to provide a lubricator having an automatically regulated feed with means for supplying and storing in a reservoir lubricant under pressure and for flushing the bearing to which the lubricator is applied. It comprises a cup containing a spring operated piston and having an outlet automatically variable in area to compensate for variations in spring pressure, such outlet discharging to the bearing and having communicating therewith a valve controlled port through which lubricant under pressure may be injected by means of a pressure pump or gun.

In the preferred construction, the supply port communicates with the discharge passage between the limits of movement of the outlet controlling valve, so that the charge of injected lubricant passes initially into the cup through the passage, which is gradually diminished in area by the movement of the valve as a result of the retraction of the piston by the pressure of the injected lubricant. When the retraction of the piston has moved the valve operated thereby to position affording minimum passage into the cup, the passage to the bearing is fully opened and the bearing may be flushed by the diversion thereto of the injected lubricant under the pressure of the pump or gun. The lubricant in the cup is then fed to the bearing at a regulated rate under control of the spring pressed plunger and the variable outlet controlled thereby to maintain the desired lubrication of the bearing.

The characteristic features of my invention will more fully appear from the following description and the accompanying drawings in illustration thereof.

Figure 1:
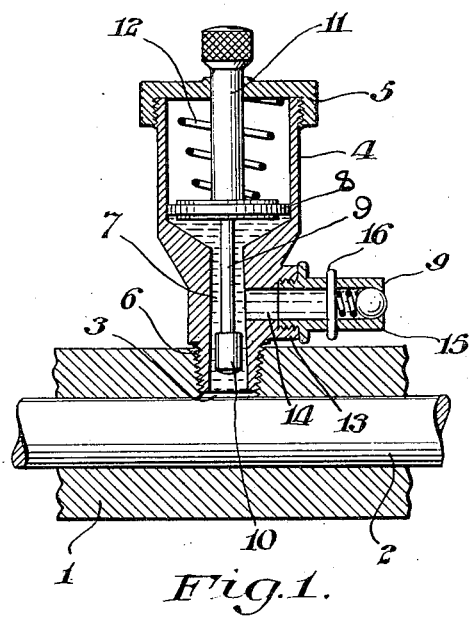
Figure 2:
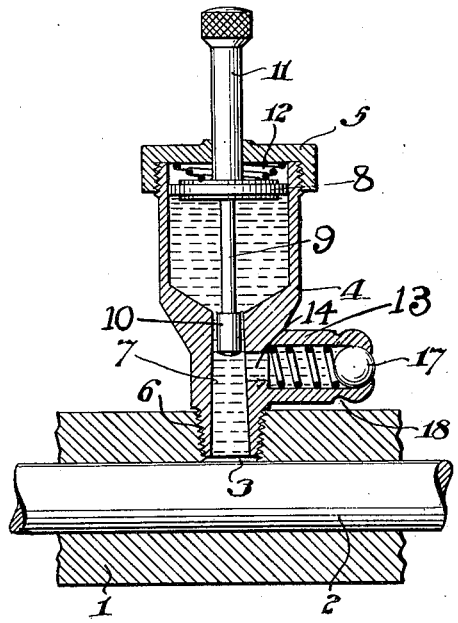
Figure 3:
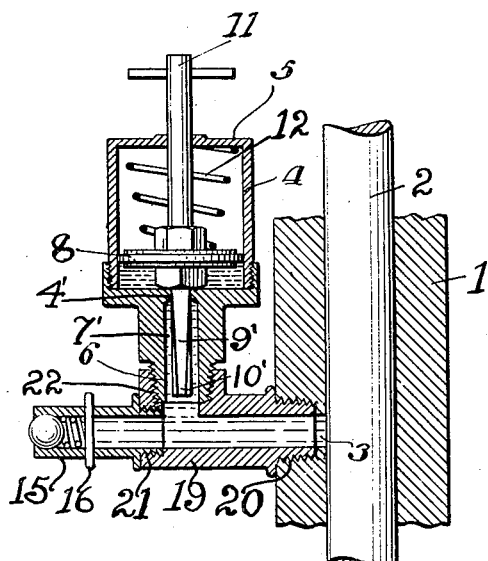
Figure 4:
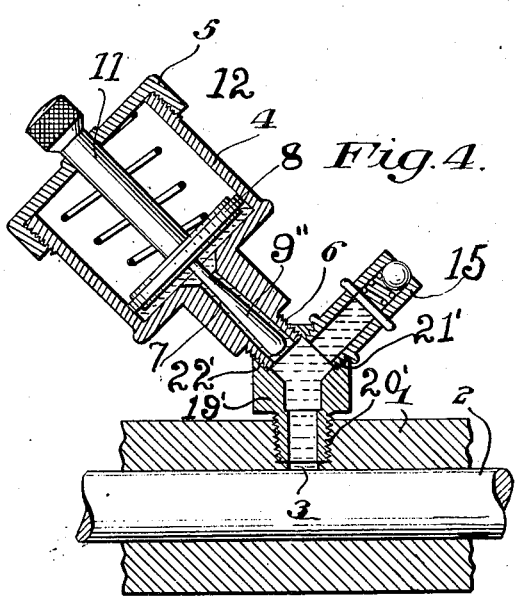

In the drawings Fig. 1 is a sectional view of a lubricator embodying my invention applied to a bearing; Fig. 2 is a sectional view of a modified embodiment of my invention; Fig. 3 is a sectional view of a further modified embodiment of my invention, and Fig. 4 is a sectional view of a further embodiment of my invention.

As illustrated, a bearing 1 containing the rotatable shaft 2, has tapped in the wall thereof a screw threaded socket 3 communicating with the clearance space between the bearing and shaft. A cup or body 4, closed at one end by a cap or head 5, is provided at the other end with a threaded stem 6, which, as shown in Figs. 1, 2 and 4, contains a tapering passage 7, and, as shown in Figs. 1 and 2, is screwed into the socket 3 so that the tapering passage communicates with the clearance space between the bearing 1 and shaft 2.

A piston or plunger 8, disposed within the cup, has (as shown in Figs. 1 and 2) fixed thereto a rod 9 to which is fixed a valve head or plug 10 reciprocable in and controlling the passage 7, and the guide rod 11 passing through the cap 5, the piston being subjected to the pressure of a coiled spring 12 disposed between the plunger and head 5.

A boss 13, formed on the stem 6, contains a port 14 communicating with the passage 7 between the upper and lower limits of movement of the head 10. As shown in Fig. 1, a check valve fitting 15, containing the spring pressed ball valve 17, is screwed into the boss and is provided with a pin 16 having projecting ends for the engagement therewith of the stem or hose of a pressure pump or gun.

As shown in Fig. 2, the spring pressed check valve 17 is inserted directly in the boss, which is provided with a groove 18 for the engagement therewith of the stem of a pressure pump or gun.

The cup illustrated in Fig. 3 differs in form but is similar in principle to the cups shown in Figs. 1 and 2, the head of the cup shown in Fig. 3 being integral with the body 4 thereof and the latter having a threaded connection with the stem 6, which contains the passage 7' of uniform cross-section communicating with the interior of the cup through an orifice 4' of uniform cross-section. A valve stem 9', fixed to the piston 8 and containing tapered grooves 10', is reciprocable in the orifice 4' and passage 7' so as to regulate the area of the port through which lubricant may be discharged from the cup so as to compensate for variations in the pressure of the spring 12. With this cup, there may be used a coupling 19 having a threaded end 20 screwed into the socket 3, a threaded socket 21 for the reception of the check valve fitting 15 and a socket 22 for the reception of the threaded stem 6.

Upon the engagement of a pressure gun with the check valve fitting 15 and pin 16, lubricant under pressure may be forced into the coupling and will initially follow the path of least resistance afforded by the passage into the grease cup 4, the valve stem 9 being in its lowermost position affording maximum area of the orifice into the cup. When the cup has been filled and the orifice thereinto partially closed, the grease is diverted through the coupling to flush the clearance between the bearing 1 and shaft 2.

Fig. 4 shows a grease cup similar to that illustrated in Figs. 1 and 2 excepting that the valve stem 9'' is tapered throughout its length so as to vary the area of the passage 7 to compensate for variations in the pressure of the spring 12. In this figure, the grease cup is connected with the bearing through a coupling 19' having a stem 20' screwed into the socket 3, a socket 21' for the reception of the check valve fitting 15 and a socket 22' for the reception of a stem 6 of the cup. In this embodiment of the invention, the sockets of the coupling are so formed that the axes of the fitting 15 and the cup 4 extend diagonally (suitably at a 45° angle or such other inclination as may be most convenient) to the axis of the shaft 2.

In operation, a grease gun of usual or special form is connected with the valve controlled fitting or coupling of the lubricator, and upon applying pressure the lubricant is forced from the gun past the check valve. As the resistance to the introduction of a lubricant, such as grease, into a bearing is high, the lubricant will initially take the path of least resistance through the passageway into the cup, until the resistance to travel in such path is increased to such an extent by the closure of the passage by the reciprocable valve and the filling of the cup that the grease is diverted into the clearance between the bearing and shaft, which is flushed thereby. Upon removal of the gun, escape of lubricant through the fitting or coupling is prevented by the check valve, and the lubricant in the cup is forced by pressure of the spring on the plunger into the bearing at a rate regulated by the pressure of the spring and the variation of the area of the orifice by the control valve.

From the foregoing it will be understood that the invention is not confined to any specific type of exit-orifice controlled grease cup or to any specific form of inlet coupling or fitting for effecting the supply of grease to the cup, but that variations may be made in the details of the elements entering into the structure defined by the appended claims.

Having described my invention, I claim:

1. The combination with a bearing, of a lubricator comprising a reservoir having a passage connected therewith provided with an inlet port and a port discharging to said bearing, a valve movable in said passage for controlling the flow of lubricant from said inlet to said reservoir, and means responsive to flow of lubricant to said reservoir for varying the position of said valve.

2. A lubricator comprising a reservoir having a passage connected therewith provided with inlet and discharge ports, a valve operable in said passage to vary the resistance to flow of lubricant from said inlet port to said reservoir, said inlet port communicating with said passage between the limits of movement of said valve, and means responsive to flow of lubricant to said reservoir for varying the position of said valve so as to bypass lubricant from said inlet to said discharge port.

3. A lubricator comprising a reservoir having a valve controlled port controlling the passage of lubricant thereto and therefrom, means responsive to flow of lubricant to or from said reservoir for varying the effect of said valve, a valve controlled passage for supplying lubricant under pressure to said reservoir through said port and a passage through which lubricant flowing from said port is delivered to a bearing.

4. A lubricator comprising a reservoir having a passage communicating therewith and terminating in separate inlet and discharge ports, a valve movable in said passage and controlling the passage of lubricant from said inlet port to said reservoir and from said reservoir to said discharge port, a piston in said reservoir responsive to flow of lubricant thereto and therefrom for varying the position of said valve so as to reduce the pressure within the reservoir in filling below the pressure of the lubricant supply flowing thereto.

5. A lubricator comprising a reservoir having a passage connected therewith and terminating in separate inlet and discharge ports, a valve operable in said passage to vary the resistance to flow of lubricant from said inlet port to said reservoir and from said reservoir to said discharge port, means responsive to the flow of lubricant to said reservoir for varying the position of said valve, said inlet port communicating with said passage at a point between the discharge port and the position of said valve for effecting maximum retardation of flow.

Signed at Philadelphia, in the county of Philadelphia and State of Pennsylvania, this 6th day of July, 1922.

JOHN ROME BATTLE.